United States Patent [19]

Kantner et al.

[11] 4,157,865
[45] Jun. 12, 1979

[54] TRANSPORT MECHANISM FOR SOUND CINE CAMERA OR THE LIKE

[75] Inventors: Otto Kantner; Peter R. von Belvärd, both of Vienna, Austria

[73] Assignees: Karl Vockenhuber; Raimund Hauser, both of Vienna, Austria

[21] Appl. No.: 919,984

[22] Filed: Jun. 28, 1978

Related U.S. Application Data

[63] Continuation-in-part of Ser. No. 791,210, Apr. 27, 1977, abandoned.

[30] Foreign Application Priority Data

May 11, 1976 [AT] Austria .................................. 3447/76

[51] Int. Cl.² ............................................. G03B 31/02
[52] U.S. Cl. ...................................... 352/27; 352/29; 352/72; 352/174; 242/197
[58] Field of Search .................. 352/27, 29, 72, 174; 242/197, 198, 199

[56] References Cited

U.S. PATENT DOCUMENTS

| | | | |
|---|---|---|---|
| 3,825,327 | 7/1974 | Kosarko et al. ........................ 352/29 |
| 3,963,331 | 6/1976 | Komine et al. ......................... 352/29 |
| 3,970,378 | 7/1976 | Takagi et al. .......................... 352/29 |
| 4,066,345 | 1/1978 | Freudenschuss et al. ............. 352/27 |
| 4,070,107 | 1/1978 | Freudenschuss et al. ............. 352/27 |

Primary Examiner—Monroe H. Hayes
Attorney, Agent, or Firm—Montague & Ross

[57] ABSTRACT

A sound cine camera with a cassette-receiving compartment, in which a pinch roller is movable toward a continuously rotating capstan to drive a motion-picture film, is provided with a manually operable control member whose displacement into an off-normal position, against the force of a restoring spring, prepares or completes an energizing circuit for the film drive. The control member is linked with a pinch-roller support through a releasable coupling which remains effective only as long as the compartment cover or a latch thereof is in a closure position. Clamping pressure is exerted upon the pinch roller by a biasing spring engaging its support and acting upon the control member through a camming or toggle mechanism which reduces the holding force required to maintain that pressure when the control member is in its off-normal position.

9 Claims, 4 Drawing Figures

TRANSPORT MECHANISM FOR SOUND CINE CAMERA OR THE LIKE

CROSS-REFERENCE TO RELATED APPLICATION

This is a continuation-in-part of our copending application Ser. No. 791,210 filed Apr. 27, 1977 and now abandoned.

FIELD OF THE INVENTION

Our present invention relates to an apparatus, such as a sound cine camera, having a compartment for the insertion of a cassette holding a tapelike information carrier, such as a motion-picture film provided with a sound track, which is to be transported past a transducer such as a recording head. The compartment has a door or cover, provided with a latch or the like, whose closure is a prerequisite for the operation of drive means including a capstan and a pinch roller adapted to entrain the tape or film strip.

BACKGROUND OF THE INVENTION

Such sound cine cameras are already known, for example, from German printed specifications Nos. 2,408,107 and 2,447,449 and corresponding U.S. Pat. Nos. 3,825,327 and 3,963,331. Reference may also be made to commonly owned U.S. Pat. Nos. 4,066,345 and 4,070,107, granted to us jointly with Otto Freudenschuss, which show pinch-roller supports controlled by the door of a cassette compartment. In all these prior systems the pinch roller can be pressed against the rotating capstan only if the cover or its latch is closed while a control member is actuated. The pinch roller is biased toward the capstan by a spring of considerable force which must be absorbed by the cover. This creates no problem when the camera body is made of metal; with less expensive models using plastic casings and covers, however, such stresses should be minimized.

OBJECTS OF THE INVENTION

The general object of our present invention is to provide means in an apparatus of the type referred to for preventing the clamping of a film strip or other tapelike information carrier in an open state of a cassette compartment without transmitting the clamping pressure to the compartment door or cover, thus allowing the latter to be made of a relatively weak material such as synthetic resin.

A related object is to provide means for minimizing the extent to which the aforementioned clamping pressure is transmitted to the fingers of the user in the operation of the apparatus.

SUMMARY OF THE INVENTION

An apparatus embodying our invention, referred to hereinafter for convenience as a camera, has a casing which forms a cassette compartment closable by a cover or door, the compartment containing drive means of the above-discussed type. In conformity with conventional practice, the capstan and the pinch roller are relatively displaceable by movable support means, usually a holder carrying the pinch roller; in principle, however, the capstan may be movably supported for displacement toward and away from the pinch roller. A relative displacement of the pinch roller and the capstan from a separated position—facilitating insertion of the film—into a closely juxtaposed position clamps the film therebetween for entrainment by the continuously rotating capstan. Activation of the drive means, i.e., rotation of the capstan and clamping of the film, is achieved with the aid of operating means including a control member which is manually movable between an inactive normal position and an active off-normal position. The control member may be either a pushbutton-type trigger or an associated actuating lever designed to prevent untimely triggering.

Pursuant to our present improvement, the control member is linked with the support means by a releasable coupling serving to establish the aforedescribed clamping position upon movement of the control member into its off-normal position. The coupling is acted upon by restoring means urging the pinch roller and the capstan away from each other. When the cassette compartment is not properly closed, i.e., in an open position of its closure means constituted by the cover or its latch, the connection between the control member and the support means is severed by a release of the coupling effected with the aid of decoupling means responsive to movement of the closure means into an open position, such release rendering the restoring means effective to separate the pinch roller from the capstan regardless of the position of the control member.

According to a more specific feature of our invention, the coupling comprises a pair of codirectionally movable elements, namely a first element connected with the control member and a second element connected with the support means and engaged by the restoring means.

Pursuant to another advantageous feature of our invention, the connection between the support means and the second coupling element is of a nonlinear character transmitting a diminishing reaction force to the control member upon relative displacement of the pinch roller and the capstan into their juxtaposed position. This nonlinear connection, which may comprise a camming mechanism or a toggle linkage as more fully described hereinafter, absorbs all or part of a clamping pressure exerted upon the pinch roller by a biasing spring so that not more than a fraction of that clamping pressure is transmitted to the control member when the pinch roller and the capstan are juxtaposed. Thus, only a reduced holding force needs to be applied by the user during operation of the apparatus.

BRIEF DESCRIPTION OF THE DRAWING

The above and other features of our invention will now be described in detail with reference to the accompanying drawing in which.

SPECIFIC DESCRIPTION

Figure 1:
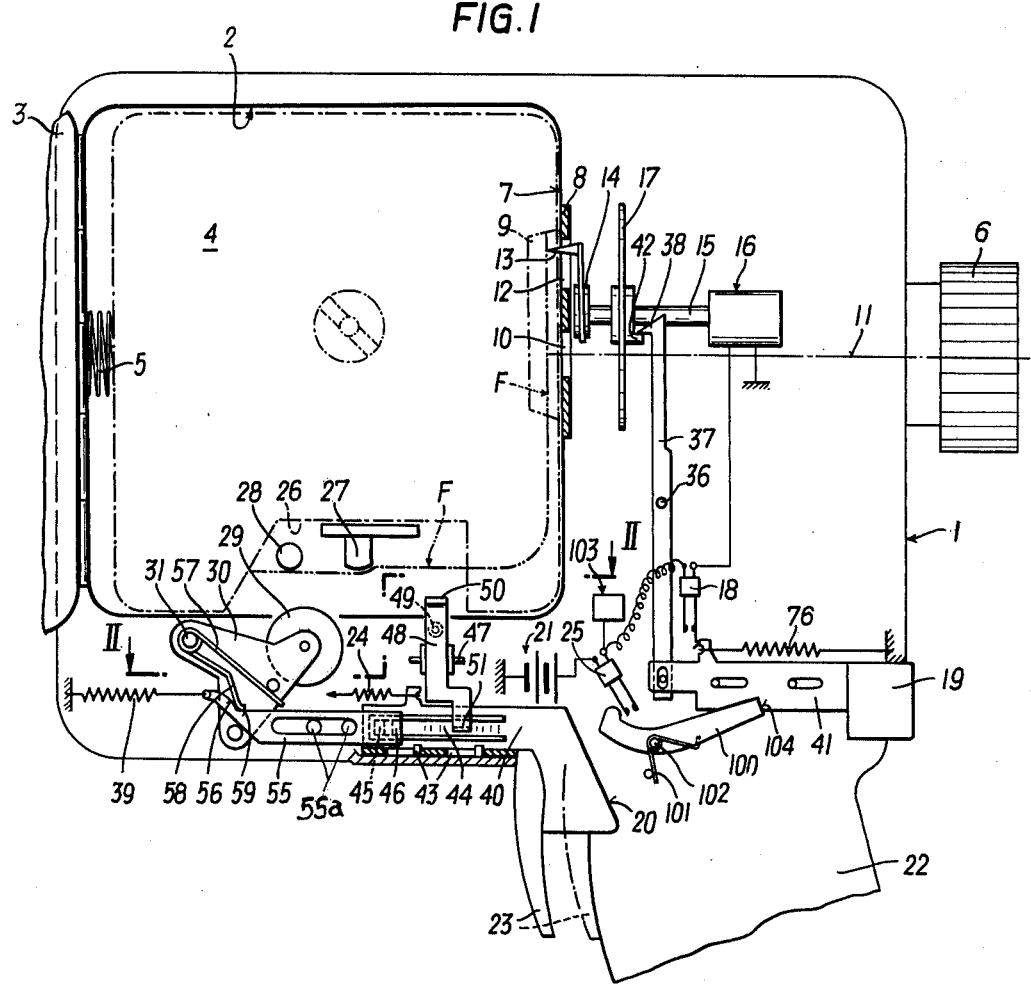
FIG. 1 shows a side view of a camera according to our invention.

A camera 1 is provided with a compartment 2 which may be closed by a cover 3 shown partially broken away in FIG. 1. The compartment 2 serves for the insertion of a sound-film cassette 4 shown in dot-dash outline. The cassette 4 is pressed by means of a coil spring 5, as known per se, inside the compartment 2 toward its front wall 7 facing an objective 6 of the camera. This front wall 7 includes an image gate formed by an apertured plate 8 opposite which the cassette 4 is provided with an opening 9 for exposure of a film F. In line with this opening 9 the plate 8 has a window 10 centered on the optical axis 11 of the objective 6 and a slot 12 allowing passage of a claw 13 for moving the film F. The claw 13 is reciprocated by a cam 14 fixed on a shaft 15 which is driven by a motor 16. Shaft 15 is provided with a sector-shaped shutter disk 17 which during its rotation, as known per se, alternately blocks and unblocks the light path extending along the optical axis to the window 10.

The electrical circuit of the motor 16 contains a trigger switch 18 which may be closed by a pushbutton 19, thereby connecting a battery 21 via a main switch 25 with the motor 16 if an actuating arm 23 has been previously displaced against the force of a spring 24 toward a pistor grip 22 to close main switch 25 in series with switch 18. Arm 23 is rigid with a slider 40 having a beveled face 20 which, upon moving to the right as viewed in FIG. 1, causes a clockwise swing of a detent lever 100 about its fulcrum 102 against the force of a hairpin spring 101. Closure of switch 25 by one arm of lever 100 also energizes an exposure-control curcuit 103 including the usual light meter and adjustable diaphragm, not shown. The other lever arm, meanwhile, has been disengaged from a locking recess 104 of a slider 41 connected with the pushbutton 19 which can now be depressed.

When the pushbutton 19 is moved to the left (as viewed in FIG. 1) against the force of a restoring spring 76, slider 41 not only closes the switch 18 but also swings a lever 37 clockwise about a pivot pin 36 to withdraw a lug 38 from the path of an abutment 42 mounted on the shutter disk 17.

The claw 13 periodically pulls down the film F past the exposure window 10. The cassette 4 is provided at its bottom with a cutout 26 wherein a loop of the film F is freely accessible so that a magnetic recording head 27 and a capstan 28, both located in the compartment 2, come to lie above the film F when the compartment 2 is loaded with the cassette 4. A pinch roller 29 is held below the film F on a supporting lever 30 with a fulcrum 31. Lever 30 is provided with a hairpin spring 57 which may be stressed by a camming slide 55 to press the roller 29 against the capstan 28 which is rotated by the motor 16 (or by another motor also controlled by switch 18) via a nonillustrated transmission. An extension of slide 55 forms a convex cam surface or ramp 56 which is engaged by a leg 58 of spring 57. In the inoperative position of the slide 55, as shown, spring leg 58 rests with is free end at the foot 59 of ramp 56; when the slide 55 moves to the right, as viewed in FIG. 1, the leg 58 is deflected counterclockwise to exert an upwardly acting biasing force upon the pinch roller 29. Such rightward motion occurs, as more fully described hereinafter, when the user grips the handle 22 and squeezes the actuating arm 23. In the initial film-clamping stage, the user must overcome a comparatively large reaction force of biasing spring 57 as its leg 58 rides up the ramp 56. At the end of this motion, however, the spring leg 58 lies on a level part of the convex cam surface so that the clamping pressure is absorbed by a pair of mounting pins 55a supporting the slide 55 on the camera body; the user then needs to exert only enough force to tension two relatively weak restoring springs, i.e., a spring 24 action upon arm 23 and a spring 39 urging the camming slide 55 into its normal position, while holding the arm 23 in its operative position shown in dot-dash lines.

Figure 2:
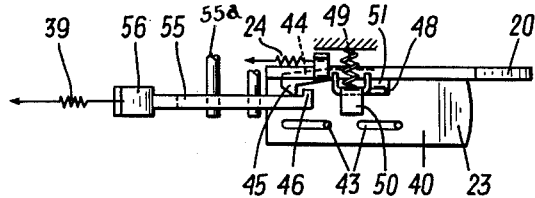
FIG. 2 is a detail view taken on the line II—II of FIG. 1.

To guard against the possibility that the user may take up the pistol grip 22 and accidentally squeeze the actuating arm 23, thus pressing the pinch roller 29 onto the capstan 28, while trying to remove the cassette 4 from the compartment 2 whereby the film F—clamped between pinch roller 29 and capstan 28—would be damaged, we provide a releasable coupling between arm 23 and camming slide 55. The slider 40 is of L-shaped cross-section and is shiftably guided on the camera body by means of slots and pins 43. In its vertical part the slider 40 is slitted to form an elastic tongue 44 having a retaining lug 45 on its free end (FIG. 2). The tongue 44 is bent so that the lug 45 projects slightly out of the plane of this vertical slider part. Normally, a bent end 46 of camming slide 55 lies in the path of the lug 45 so that a rightward movement of slider 40 will entrain the slide 55.

Fulcrumed on a pin 47, as shown in FIG. 1, is a two-armed lever 48 loaded by a compression spring 49. The upper extremity of lever 48 is provided with a feeler 50 which senses the position of the cover 3 of the camera 1 serving to close the compartment 2. If the cover 3 is closed, feeler 50 is deflected and tilts the lever 48 inwardly against the force of spring 49. If the user of the camera tries to remove the cassette 4 from the compartment 2 while the actuating arm 23 is displaced and therefore the pinch roller 29 occupies its film-clamping position in which it is pressed against the capstan 28, the latter would be damaged if no precautions were taken. But when the cover 3 is opened, the lever 48 swings about its pivot 47 under the force of the spring 49 and bears upon the elastic tongue 44 by means of a lug 51 on its lower end opposite feeler 50. Since the force of spring 49 is greater than the resistance of tongue 44, the lever 48 pushes the tongue with its retaining lug 45 out of the path of the bent end 46 of the camming slide 55. When the slide 55 is decoupled from arm 23 in this manner, it is returned by its restoring spring 39 into its inoperative position, shown in FIG. 1, so that the pinch roller 29 is retracted and disengages the film F. During this operation the slider 40 and the actuating arm 23 remain in their off-normal position. After the insertion of a new cassette and closure of the cover, the user must release the arm 23 which now resumes its full-line position under the force of the spring 24 whereby the lug 45 re-engages the coacting end 46 of the camming slide 55.

The two sliding members 40, 55 are also decoupled when the cover 3 is opened while the actuating arm 23 remains in its inoperative position shown in full lines. This is important because it inhibits any attempted extraction of cassette 4 from compartment 2 after the pinch roller has been moved into its operative position by a rightward shift of slider 40. Such an operation is prevented by making the elastic tongue 44 sufficiently long and the spring 49 strong enough to enable a disengagement of the coupling elements 44, 45 and 55, 46 in any position of the slider 40.

Figure 3:
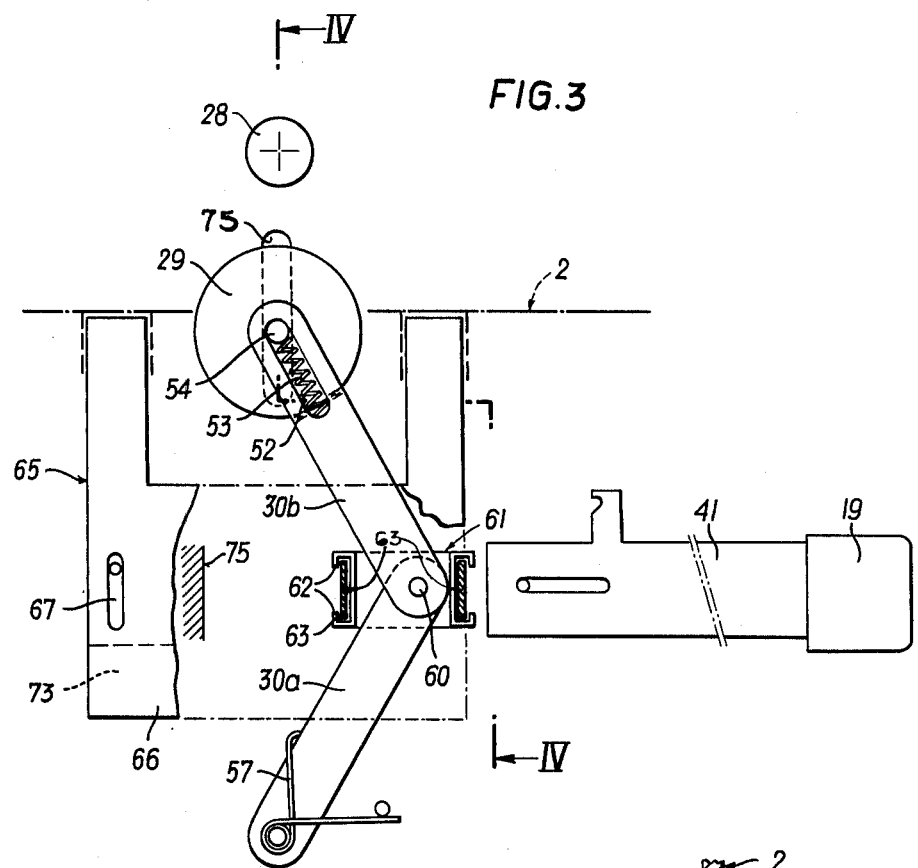
FIG. 3 shows details of another embodiment, drawn to a larger scale.
Figure 4:
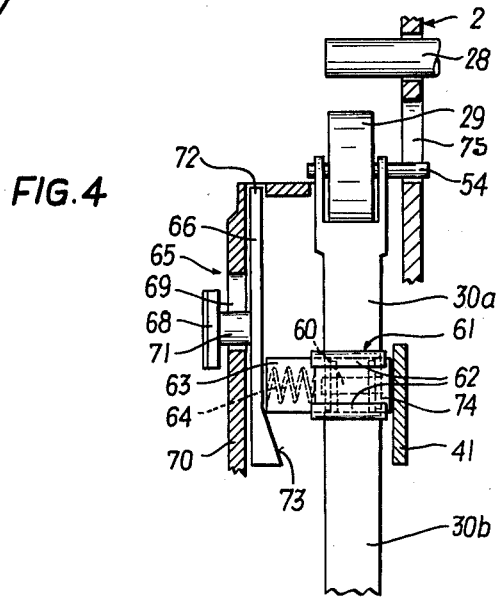
FIG. 4 is a sectional view taken on the line IV—IV of FIG. 3.

In FIGS. 3 and 4, parts having the same function as in the preceding embodiment are given reference numerals corresponding to those of FIGS. 1 and 2. The pinch roller 29 is here moved to its operative position adjacent capstan 28 by the thrust of a pushbutton-operated slider 41' whose connection with the release lever 37 of FIG. 1 has not been illustrated. Furthermore, the roller-supporting lever 30 of FIG. 1 has been replaced by a linkage comprising two toggle levers 30a and 30b, the latter serving as a holder for the pinch roller 29. To provide the necessary contact pressure between the pinch roller 29 and the capstan 28, the pinch roller is journaled in a slit 52 of the bifurcate free end of lever 30b and is biased outwardly within this slit 52 by a compression spring 53 acting upon the roller shaft 54, as schematically indicated. The shaft 54 has an extremity received in a guide slot 75 formed in the wall of the camera casing which is traversed by the capstan 28.

The two toggle levers 30a and 30b are interconnected by a pin 60 penetrating a sleeve 61 provided with guide flanges 62 on its end faces. The legs of a U-shaped clip 63, biased by a spring 64, are slidably received in these guide flanges 62. The bight of clip 63 remote from its legs abuts a latch 65 provided for the cover 3 of FIG. 1 (not shown in FIGS. 3 and 4). The latch 65 comprises a plate-shaped bolt 66 which is rectilinearly guided by pin-and-slot mountings 67 (only one shown in FIG. 3). Latch bolt 66 is provided with an actuating knob 68 whose stem 71 passes through a casing wall 70 via a slot 69. In FIG. 4 the end 72 of bolt 66 is shown retracted into an open position. In its closure position, however, the bolt engages in a coacting recess of the cover 3 in which it is frictionally retained to secure the cover 3 against accidental opening.

In its lower part the latch bolt 66 is provided with a beveled surface 73 which shifts the clip 63 against the force of the spring 64 when the latch 65 is pushed upwardly. Thus, the extremities 74 of the legs of clip 63 are moved into the path of the release slider 41' which then entrains the toggle levers 30a and 30b against the force of a hairpin-shaped loading spring 57' and drives these toggle levers beyond their dead center when the pushbutton 19 is actuated until the sleeve 61 abuts a wall 75 of the camera body. In this operation the user has to overcome not only the force of restoring spring 76, FIG. 1, but also part of the force of hairpin spring 57' and the clamping force exerted by biasing spring 52. However, after the spring 52 has been fully stressed in the dead-center position of the toggle linkage, it is partially relaxed upon passing through that position and its residual thrust balances part of the restoring force of springs 57' and 76. Thus, the user need not continue to exert the effort required for the initial activation of the film transport.

When the user attempts to open the cover 3 and lowers the latch 65 to its illustrated open position while the pushbutton 19 is actuated, the ends 74 of clip 63 are retracted from the path of slider 41'. Loading spring 57' then returns the toggle levers 30a and 30b to their inoperative position shown in FIG. 3, requiring a release of the pushbutton and relatching of the cover before filming can be resumed.

We claim:

1. In an apparatus for transporting a tapelike information carrier, stored in a cassette, past a transducer in a compartment of a casing provided with closure means for securely retaining an inserted cassette in said compartment, the combination therewith of:
drive means for advancing said information carrier, said drive means including a rotatable capstan in said compartment, a pinch roller in said compartment and movable support means for relatively displacing said pinch roller and said capstan from a separated position into a closely juxtaposed position in which said information carrier is clamped between said pinch roller and said capstan for entrainment by the latter;

pinch roller and said capstan for entrainment by the latter;
operating means for activating said drive means, said operating means including a manually movable control member having an inactive normal position and an active off-normal position;
releasable coupling means linking said control member with said support means for relatively displacing said pinch roller and said capstan into their juxtaposed position upon movement of said control member into said off-normal position;
restoring means acting upon said coupling means for urging said pinch roller and said capstan into their separated position; and
decoupling means responsive to movement of said closure means into an open position for releasing said coupling means and rendering said restoring means effective to separate said pinch roller from said capstan regardless of the position of said control member.

2. The combination defined in claim 1 wherein said coupling means comprises codirectionally movable first and second elements positively engaging each other in a closed position of said closure means, said first and second elements being respectively connected with said control member and with said support means, said second element being engaged by said restoring means.

3. The combination defined in claim 2 wherein the connection between said second element and said support means is of a nonlinear character transmitting a diminishing reaction force to said control member upon relative displacement of said pinch roller and said capstan from said separated position to said juxtaposed position thereof.

4. The combination defined in claim 3 wherein said support means comprises a holder carrying said pinch roller, said holder being provided with biasing means pressing said pinch roller onto said capstan in said juxtaposed position.

5. The combination defined in claim 4 wherein biasing means comprises a hairpin spring forming part of said connection and bearing upon a curved camming surface of said second element.

6. The combination defined in claim 4 wherein said holder is part of a toggle linkage, said restoring means comprising a loading spring engaging another part of said linkage, said biasing means including a compression spring counteracting said loading spring upon displacement of said linkage past a dead-center position thereof.

7. The combination defined in claim 2 wherein said closure means comprises a cover for said compartment, one of said elements being a resilient tongue, said decoupling means comprising a lever coacting with said cover for deflecting said tongue out of the path of the other of said elements upon detecting an open position of said cover.

8. The combination defined in claim 2 wherein said closure means comprises a cover for said compartment and a latch shiftable to hold said cover closed, said latch coacting in its open position with said second element for retracting same from the path of said first element.

9. The combination defined in claim 1 or 2 wherein said casing is part of a sound cine camera, said information carrier is a motion-picture film, and said transducer is a recording head, said drive means further including a film-engaging claw actuated by an electric motor provided with an energizing circuit including switch means closable by said control member in said off-normal position thereof.

* * * * *